(No Model.) 3 Sheets—Sheet 1.

T. W. G. COOK.
MACHINE FOR RIMMING SHOW CARDS, &c.

No. 487,609. Patented Dec. 6, 1892.

WITNESSES:
Edward Wolff.
William Miller

INVENTOR:
Thomas W. G. Cook.
BY
Van Santvoord & Hauff
ATTORNEYS.

(No Model.) 3 Sheets—Sheet 2.
T. W. G. COOK.
MACHINE FOR RIMMING SHOW CARDS, &c.
No. 487,609. Patented Dec. 6, 1892.
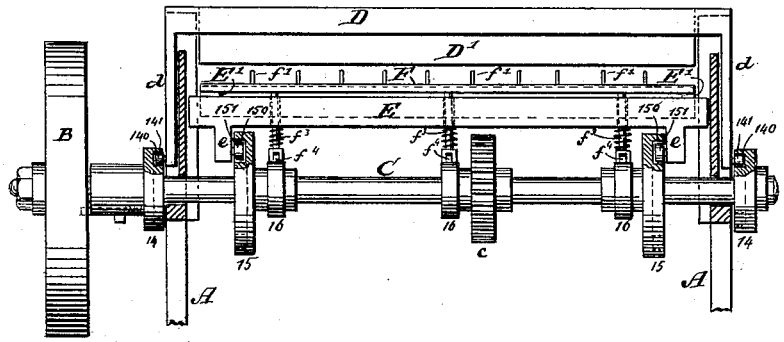
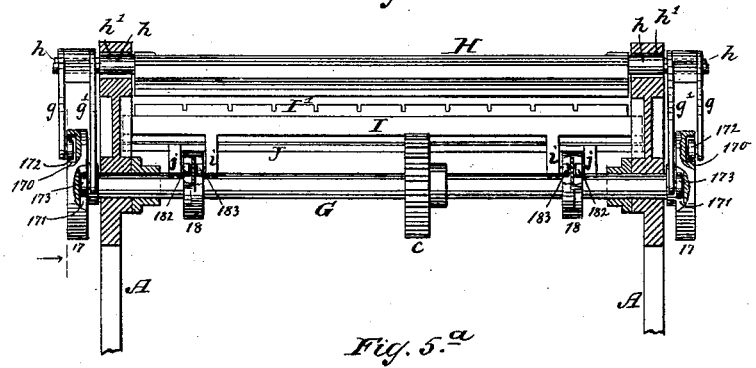
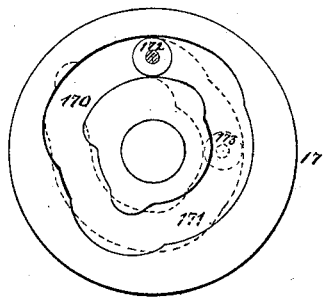
WITNESSES:
Edward Wolff
William Miller
INVENTOR:
Thomas W. G. Cook.
BY
Van Santvoord & Hauff
ATTORNEYS.

(No Model.) 3 Sheets—Sheet 3.
T. W. G. COOK.
MACHINE FOR RIMMING SHOW CARDS, &c.
No. 487,609. Patented Dec. 6, 1892.
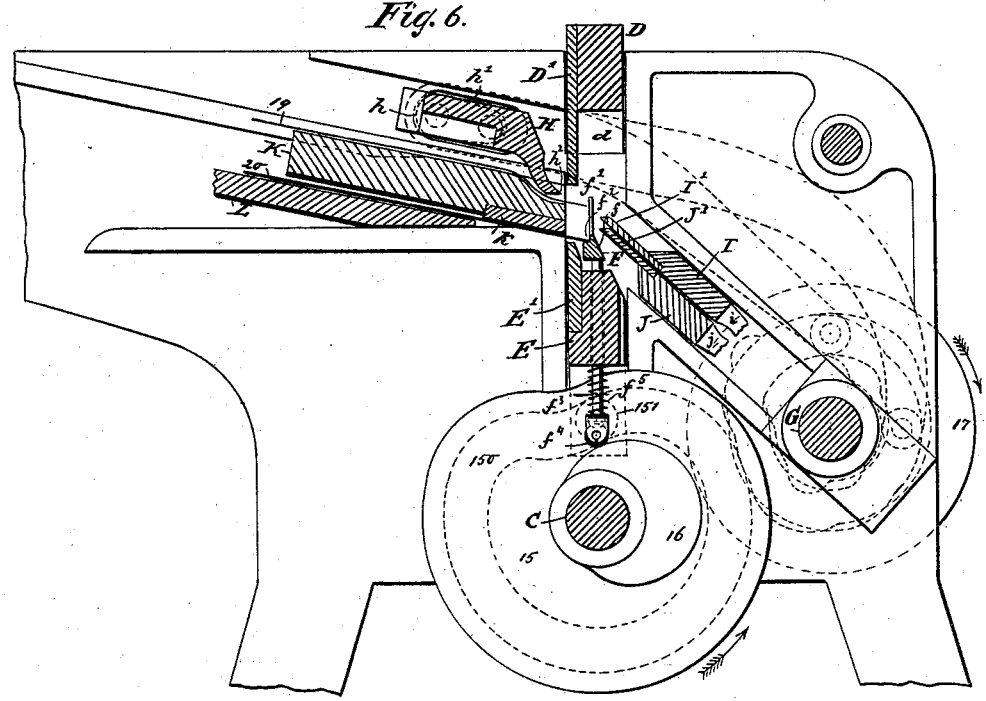
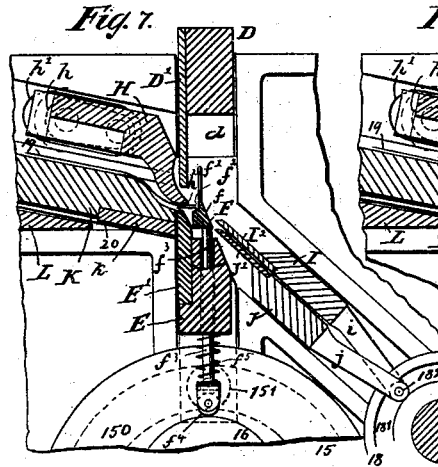
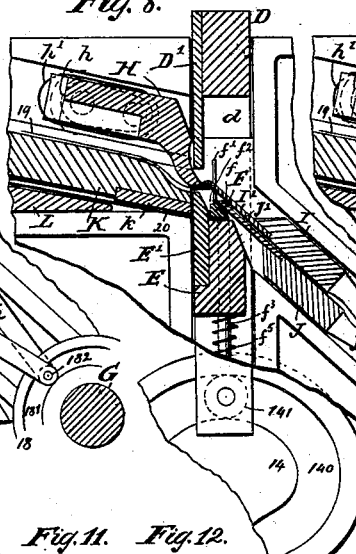
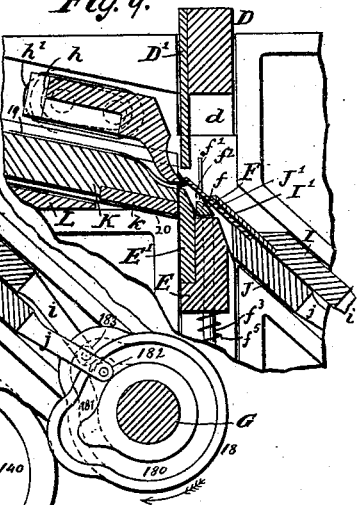
WITNESSES:
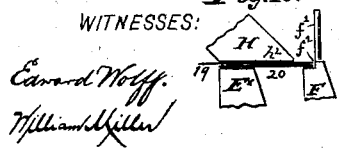
INVENTOR:
Thomas W. G. Cook
BY
Van Santvoord & Hauff
ATTORNEYS.

UNITED STATES PATENT OFFICE.

THOMAS W. G. COOK, OF NEW YORK, N. Y., ASSIGNOR TO HIMSELF AND SAMUEL KOFFELT, OF SAME PLACE.

MACHINE FOR RIMMING SHOW-CARDS, &c.

SPECIFICATION forming part of Letters Patent No. 487,609, dated December 6, 1892.

Application filed July 14, 1892. Serial No. 440,047. (No model.)

*To all whom it may concern:*

Be it known that I, THOMAS W. G. COOK, a citizen of the United States, residing at New York, in the county and State of New York, have invented new and useful Improvements in Machines for Rimming Show-Cards and other Articles, of which the following is a specification.

The object of this invention is a machine by means of which the operation of applying sheet-metal rims to show-cards, maps, or other articles of a similar nature can be performed with great rapidity and neatness.

The peculiar and novel construction of my machine is pointed out in the following specification and claims, and illustrated in the accompanying drawings, in which—

Figure 1:
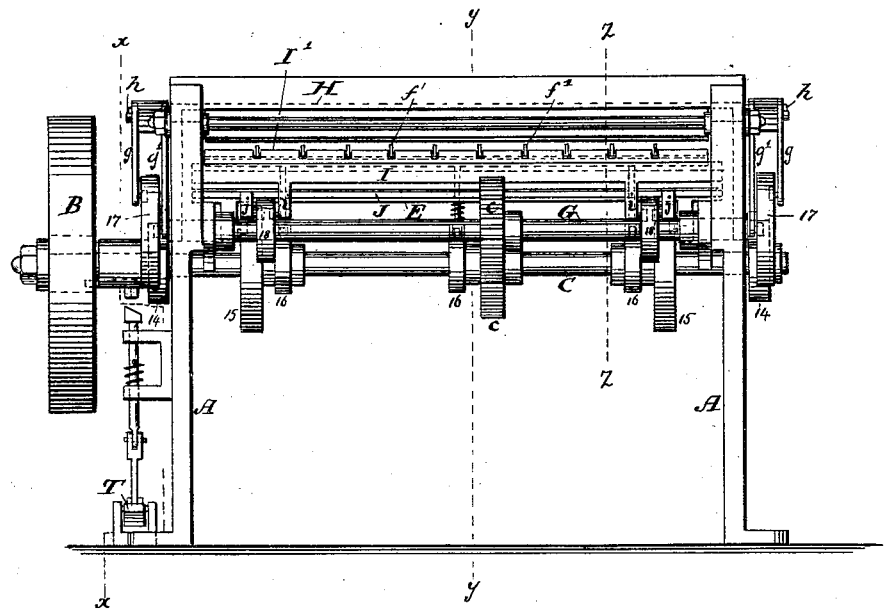
Figures 2, 3:
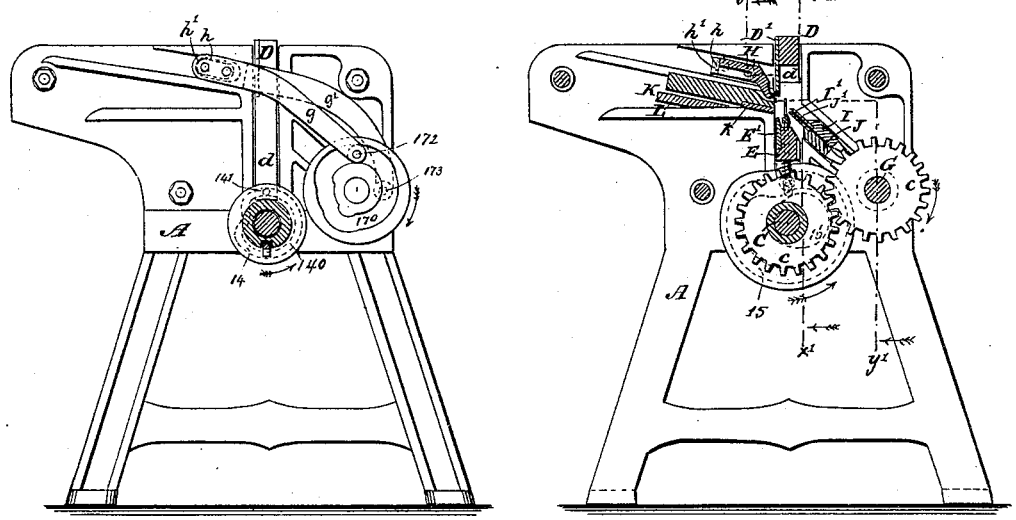

Figure 1 represents a rear elevation. Fig. 2 is a transverse vertical section in the plane $x\ x$, Fig. 1. Fig. 3 is a similar section in the plane $y\ y$, Fig. 1. Fig. 4 is a detail sectional elevation, the line of section being in the plane $x'\ x'$, Fig. 3. Fig. 5 is a similar section, the plane of section being in the line $y'\ y'$, Fig. 3. Fig. 5$^a$ is a face view of one of the cams on a larger scale than the previous figures. Fig. 6 is a detail vertical section in the plane $z\ z$, Fig. 1, on a larger scale than the previous figures. Figs. 7, 8, and 9 are detail vertical sections showing the different positions of the working parts as the operation of rimming progresses. Figs. 10, 11, 12, and 13 show the relative positions and forms of the article which is to be provided with a rim and of the material which is intended to be formed into the rim as the operation of rimming progresses.

In the drawings, the letter A designates the frame which forms the bearings for the working parts of my machine.

B is the driving-pulley, which is loosely mounted on the shaft C and connected to the same by a suitable clutch mechanism which is controlled by a treadle T, so that when the treadle is depressed the pulley B is thrown in gear with the shaft C, thereby transmitting motion to the working parts of the machine, and when the treadle is released the pulley is thrown out of gear with the shaft C and the motion of the working parts of the machine is stopped.

On the shaft C are firmly mounted four cams 14 14 and 15 15, the cams 14 14 being on the outside and the cams 15 15 in the inside of the frame A. The cams 14 are provided on their inner surfaces each with a cam-groove 140, (see Figs. 2 and 8,) and these cam-grooves engage roller-studs 141, which are secured to arms $d\ d$, which extend downward from a head D, Fig. 4, which carries the compressor D'. The cams 15 are provided with cam-grooves 150, which engage roller-studs 151, mounted on arms $e\ e$, which extend from a head E, Fig. 4, carrying the knife E'. (Best seen in Figs. 6 to 9.)

On the shaft C are also mounted eccentrics 16, Figs. 4 and 6, which serve to adjust the gage F. This gage consists of a head $f$ and pins $f'$, the head $f$ being provided with a shoulder $f^2$ and with spring-actuated legs $f^3$, which extend through the knife-head E and carry roller-studs $f^4$, which are held in contact with the eccentrics 16 by springs $f^5$. The shaft C is geared by cog-wheels $c\ c$ with a shaft G, on which are mounted four cams 17 17 and 18 18, the cams 17 being situated on the outside and the cams 18 on the inside of the frame A. (Best seen in Fig. 5.) Each of the cams 17 is provided with two cam-grooves 170 and 171, said grooves being formed in the opposite faces of the cam-disk, as indicated in Fig. 5$^a$, where the cam-groove 170 is shown in full and the cam-groove 171 in dotted lines. The cam-groove 170 engages a roller-stud 172, which is mounted on an arm $g$, and the cam-groove 171 engages a roller-stud 173, which is mounted on an arm $g'$. The arms $g\ g'$ are firmly mounted on gudgeons $h$, which extend from the ends of the bending-die H, and are guided in slots $h'$ in the frame A. The bending-die H is provided with a sharp edge $h^2$, (see Figs. 6 to 9,) the object of which will be presently explained, and the cams 17 and arms $g\ g'$ serve to impart to said bending-die a complex sliding and rocking motion and to retain said die firmly in the position which it may occupy at any moment during the operation. The cams 18, which are mounted on the shaft G on the inside of the frame A, are provided each with two cam-grooves 180 and 181, formed in its opposite faces. (See Figs. 5 to 8.) The cam-grooves 181 engage roller-studs 183, mounted on arms *i*, which extend from a head I, to which is secured the first bending-blade I', and the cam-grooves 180 engage roller-studs 182, mounted on arms *j*, which extend from a head J, to which is secured the second bending-blade J'. The bending-blades I' J' are provided with recesses, so as to clear the pins *f'*. (See Fig. 1.)

K is the feed-table for the show-card or other article 19, and to this feed-table is secured a cutter *k*, which co-operates with the knife E'.

L is a feed-table for the rimming material 20, which consists of a plate of tinned sheet-iron or equivalent substance. When the treadle T is released, the movement of the machine is stopped and the working parts occupy the position shown in Fig. 6. Then the article to be rimmed is pushed in until its front edge strikes the pins *f'* of the gage F and the rimming material is pushed in until its front edge strikes the shoulder $f^2$ of the gage F. The treadle T is now depressed and the bending-die H is moved to the position shown in Fig. 7, while at the same time the knife E' moves up so as to cut off a strip of the rimming material, which is pressed up against the article to be rimmed and retained between the upper surface of the knife E' and the lower surface of the bending-die H, as indicated on an enlarged scale in Fig. 10. Immediately thereafter the gage F drops down to the position shown in Fig. 8 and the bending-blade I' is pushed inward, so as to bend the rimming material and the material to be rimmed, as shown in Fig. 11. Then the bending-die H and the bending-blade I' recede to the position shown in Fig. 9, and the bending-blade J' advances so as to bend the rimming material and the material to be rimmed into the position shown in Fig. 12. When this operation has been accomplished, the bending-blade J' recedes and the compressor D' descends and compresses the rimming material and the material to be rimmed into the position shown in Fig. 13, said materials being supported by the knife E' until this compression has been effected. When this operation has been accomplished, the treadle is released and the machine stops, leaving the working parts in the position shown in Fig. 6, ready for the next rimming operation.

In some cases it may be desirable to bend the rimming-material alone to the position shown in Fig. 11 and complete the rimming operation by hand, and in this case the compressor and the bending-blade J' may be left out, or the rimming material may be bent to the position shown in Fig. 12, and in this case the compressor may be left out.

What I claim as new, and desire to secure by Letters Patent, is—

1. The combination of the upper and lower feed-tables K and L, a movable knife E' and a movable gage F, arranged in juxtaposition to the inner end of the upper feed-table, a movable bending-die H, located above the upper feed-table, a movable compressor D', located above the knife and the gage, a pair of alternately-moving bending-blades I' and J' in rear of the bending-die, and operating devices for imparting timed movements to the knife, the gage, the bending-die, the bending-blades, and the compressor, substantially as described.

2. The combination of the upper and lower feed-tables K and L, a reciprocating knife E' and a reciprocating gage F, arranged in juxtaposition to the inner end of the upper feed-table, a reciprocating and oscillating bending-die H, located above the upper feed-table, a vertically-reciprocating compressor D', arranged above the knife, a pair of alternately-moving bending-blades I' and J', located in rear of the knife and bending-die, and cam mechanism for operating the knife, the gage, the bending-die, the compressor, and the bending-blades, substantially as described.

3. The combination, with a feed-table L, of a rising-and-falling gage F, located in juxtaposition to the inner end of the feed-table, a rising-and-falling knife E', interposed between the gage and the feed-table, a movable bending-die H, arranged above the knife and feed-table, a reciprocating bending-blade located in rear of the gage, and means for imparting timed movements to the gage, the knife, the bending-die, and the bending-blades, substantially as described.

4. The combination, with a feed-table L, of a rising-and-falling gage F, arranged in juxtaposition to the inner end of the feed-table, a rising-and-falling knife E', interposed between the gage and the feed-table, a movable bending-die H, located above the knife, a pair of alternately-reciprocating bending-blades located in rear of the gage, and means for imparting timed movements to the gage, the knife, the bending-die, and the bending-blades, substantially as described.

5. The combination of the upper and lower feed-tables K and L, a shouldered gage F, arranged in juxtaposition to the inner end of the upper feed-table, a shaft C, located below the gage and provided with an eccentric 16, devices acted on by the eccentric and connected with the gage for controlling the position of the latter, a movable knife E', interposed between the gage and the feed-tables, a bending-die H, located above the knife, a pair of alternately-moving bending-blades I' and J', arranged in rear of the gage, a compressor D', located above the gage and bending-blades, and means for imparting timed movements to the gage, the knife, the bending-die, the bending-blades, and the compressor, substantially as described.

6. The combination of the upper and lower feed-tables K and L, a gage F, arranged in juxtaposition to the inner end of the upper feed-table, a knife E', interposed between the gage and the feed-tables, a bending-die H, located above the knife and provided with gudgeons $h$, extending through slots in the frame of the machine, a shaft G, located in rear of the gage and provided with a cam 17, the arms $g\ g'$, extending from the gudgeons of the bending-die and engaging said cam for operating said die, a pair of alternately-moving bending-blades I' and J', arranged in rear of the gage, a compresser D', located above the knife, and means for imparting timed movements to the gage, the knife, the bending-blades, and the compressor, substantially as described.

7. The combination of the upper and lower feed-tables K and L, a gage F, arranged in juxtaposition to the inner end of the upper feed-table, a knife E', interposed between the gage and the feed-tables, a bending-die H, located above the knife, a shaft G, provided with a cam 18, the alternately-moving bending-blades I' and J', arranged in rear of the gage and provided with arms $i\ j$, which engage the said cam, a compressor D', located above the knife, and means for imparting timed movements to the gage, the knife, the bending-die, and the compressor, substantially as described.

8. The combination of two separate feed-tables, a reciprocating gage arranged in juxtaposition to the inner ends of the feed-tables, a reciprocating knife interposed between the gage and the feed-tables, a reciprocating compressor which moves between the feed-tables and the gage, a movable bending-die located in juxtaposition to the compressor and to the inner end of one of the feed-tables, a pair of alternately-moving heads provided with bending-blades and located at the side of the gage opposite the knife, a cam mechanism for operating the bending-blades and the bending-die, and a cam mechanism for operating the gage, the knife, and the compressor, substantially as described.

In testimony whereof I have hereunto set my hand in the presence of two subscribing witnesses.

THOMAS W. G. COOK.

Witnesses:
J. VAN SANTVOORD,
W. HAUFF.